(12) United States Patent
Oguro et al.

(10) Patent No.: US 11,228,046 B2
(45) Date of Patent: Jan. 18, 2022

(54) FUEL CELL DEVICE

(71) Applicants: DAINICHI CO., LTD., Niigata (JP); KYOCERA CORPORATION, Kyoto (JP)

(72) Inventors: Hiroki Oguro, Niigata (JP); Shintaro Yanagiuchi, Niigata (JP); Tomoki Oyanagi, Niigata (JP); Shinpei Shiraishi, Yokohama (JP)

(73) Assignees: DAINICHI CO., LTD., Niigata (JP); KYOCERA CORPORATION, Kyoto (JP)

( * ) Notice: Subject to any disclaimer, the term of this patent is extended or adjusted under 35 U.S.C. 154(b) by 32 days.

(21) Appl. No.: 16/625,815

(22) PCT Filed: Jun. 20, 2018

(86) PCT No.: PCT/JP2018/023531
§ 371 (c)(1),
(2) Date: Dec. 23, 2019

(87) PCT Pub. No.: WO2019/004032
PCT Pub. Date: Jan. 3, 2019

(65) Prior Publication Data
US 2020/0395623 A1 Dec. 17, 2020

(30) Foreign Application Priority Data
Jun. 30, 2017 (JP) .............................. JP2017-129926

(51) Int. Cl.
*H01M 8/04014* (2016.01)
*H01M 8/04029* (2016.01)
(Continued)

(52) U.S. Cl.
CPC ... *H01M 8/04014* (2013.01); *H01M 8/04029* (2013.01); *H01M 8/04731* (2013.01); *H01M 8/2475* (2013.01)

(58) Field of Classification Search
CPC .......... H01M 8/0414; H01M 8/04029; H01M 8/04731; H01M 8/2475
See application file for complete search history.

(56) References Cited

U.S. PATENT DOCUMENTS

2006/0228595 A1* 10/2006 Fujita .................. H01M 16/006
429/9
2010/0310959 A1 12/2010 Shinoda et al.
(Continued)

FOREIGN PATENT DOCUMENTS

JP 2009181700 A 8/2009
JP 2009266634 A 11/2009
(Continued)

*Primary Examiner* — Olatunji A Godo
(74) *Attorney, Agent, or Firm* — Viering, Jentschura & Partner MBB

(57) ABSTRACT

A fuel cell device may be realized by including a fuel cell module including a container and a fuel cell housed in the container; a plurality of auxiliary machines for operating the fuel cell module; and an exterior case that houses the fuel cell module and the auxiliary machines, wherein at least one auxiliary machine of the plurality of auxiliary machines may be an upper auxiliary machine which is located on an upper side of the fuel cell module, and the fuel cell device may further include a fan located on the upper side of the fuel cell module.

9 Claims, 10 Drawing Sheets

(51) Int. Cl.
*H01M 8/04701* (2016.01)
*H01M 8/2475* (2016.01)

(56) References Cited

U.S. PATENT DOCUMENTS

2011/0274995 A1  11/2011  Tanabe et al.
2016/0268612 A1   9/2016  Ushiyama

FOREIGN PATENT DOCUMENTS

| JP | 5916707 B2 |   | 5/2016 |
| JP | 2016181378 | * | 10/2016 |
| JP | 2016181378 A |   | 10/2016 |

* cited by examiner

FUEL CELL DEVICE

CROSS-REFERENCE TO RELATED APPLICATIONS

This application is a national stage entry according to 35 U.S.C. 371 of International Application No. PCT/JP2018/023531 filed on Jun. 20, 2018, which claims priority to Japanese Patent Application No. 2017-129926 filed on Jun. 30, 2017, the contents of which are entirely incorporated herein by reference.

TECHNICAL FIELD

The present disclosure relates to a fuel cell device.

BACKGROUND

In recent years, as energy sources for the next-generation, there may be various fuel cell modules in which a cell stack in which a plurality of fuel cells that obtain electric power by utilizing a fuel gas (hydrogen-containing gas) and air (oxygen-containing gas), are stacked is housed in a container, and also various fuel cell devices in which a fuel cell module may be housed in an exterior case.

Such a fuel cell device may incorporate, in addition to the fuel cell module, auxiliary machines including a heat exchanger, a supplied-power adjustment section, a radiator, a water tank, a fuel pump for feeding fuel gas to the fuel cell module, and an air blower for feeding air to the fuel cell module, placed in the exterior case.

In such a fuel cell device, the auxiliary machines may be located on a lower side of the fuel cell module in the exterior case to avoid the influence of heat from the fuel cell module (refer to Japanese Unexamined Patent Publication JP-A 2009-181700 (Patent Literature 1), for example).

SUMMARY

A fuel cell device may include: a fuel cell module including a container and a fuel cell housed in the container; a plurality of auxiliary machines for operating the fuel cell module; and an exterior case that houses the fuel cell module and the auxiliary machines. At least one auxiliary machine of the plurality of auxiliary machines may be an upper auxiliary machine which is located on an upper side of the fuel cell module, and, the fuel cell device may further include a fan located on the upper side of the fuel cell module.

BRIEF DESCRIPTION OF DRAWINGS

Other and further objects, features, and advantages of the disclosure will be more explicit from the following detailed description taken with reference to the drawings wherein.

DETAILED DESCRIPTION

Figure 1:
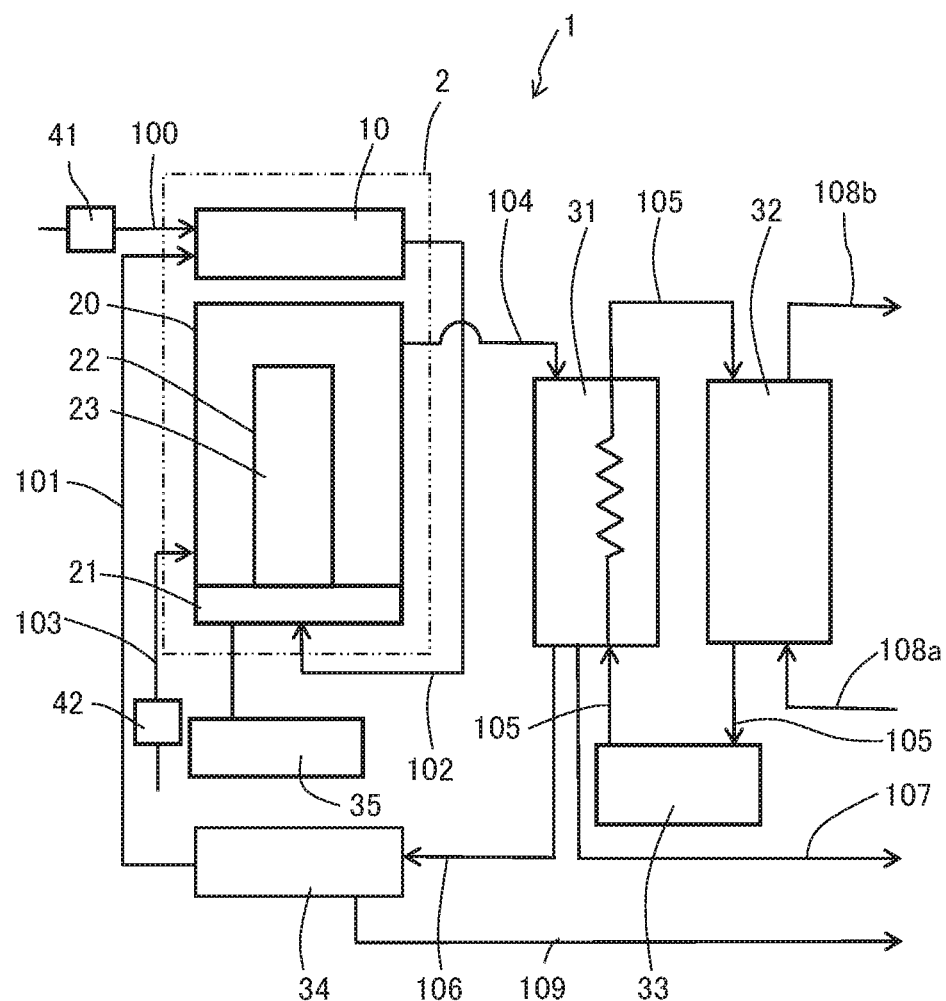
FIG. 1 is a block diagram showing an example of a fuel cell device according to a non-limiting embodiment.
Figure 2:
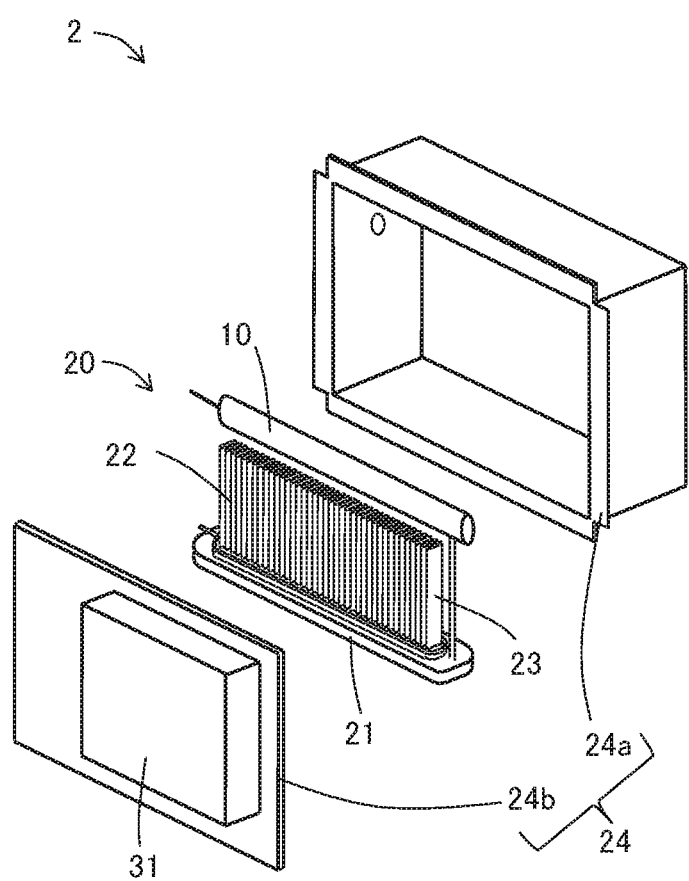
FIG. 2 is an exploded perspective view showing an example of a fuel cell module according to the non-limiting embodiment.

Now referring to the drawings, various non-limiting embodiments of the disclosure are described below. FIG. 1 is a block diagram showing an example of a fuel cell device according to the non-limiting embodiment. Moreover, FIG. 2 is an exploded perspective view showing an example of a fuel cell module. Throughout the drawings to be hereafter referred to, the same reference numerals denote the same constituent components. A fuel cell device 1 includes a fuel cell module 2 in which a reformer 10 and a cell stack device 20 are housed in a container (hereafter also referred to as "housing 24"). Moreover, in the fuel cell device 1, in addition to the fuel cell module 2, a plurality of auxiliary machines for operating the fuel cell module 2, such as a heat exchanger 31, a heat storage tank 32, a heat dissipator 33, a condensate water tank 34, a supplied-power adjustment section 35, a fuel supply device 41, and an air supply device 42, are housed in an exterior case (not shown). It is not absolutely necessary that all of the aforenamed components are housed in the exterior case. For example, the heat exchanger 31 and the heat storage tank 32 may be disposed outside the exterior case. Moreover, one or more of the aforenamed components may be omitted from the fuel cell device.

The reformer 10 is connected with a raw fuel supply pipe 100 for supplying a raw fuel and a water supply pipe 101 for supplying reformed water. The raw fuel supply pipe 100 is provided with a fuel supply device 41 for feeding a raw fuel to the reformer 10. In the heated reformer 10, the raw fuel and the reformed water undergo reforming reactions with each other to yield a hydrogen-containing reformed gas. After passing through a reformed gas supply pipe 102, the reformed gas produced in the reformer 10 is supplied to the cell stack device 20.

The cell stack device 20 includes a manifold 21 and a cell stack 22 in which many fuel cells 23 are connected to each other. The reformed gas supplied to the cell stack device 20 from the reformer 10 is fed into the cell stack 22 through the manifold 21. In the cell stack device 20, air, viz., oxygen-containing gas is introduced via an air supply pipe 103 outside the cell stack 22. The air supply pipe 103 is connected with the air supply device 42. The air supply device 42 delivers air to the cell stack device 20. When passing through the interior of the cell stack 22, the reformed gas reacts with the air for power generation. A reformed gas left unused for power generation merges with air left unused for power generation in a region above the cell stack 22, and the resulting confluent flow is burned to yield a high-temperature exhaust gas. Moreover, the reformer 10 is heated under heat resulting from the combustion. Electricity generated in the fuel cell module 2 is conveyed to the supplied-power adjustment section 35 for the purposes of preparation for power consumption and power storage in rechargeable batteries, for example.

The reformer 10 and the cell stack device 20, which are exposed to great heat, are covered with a heat insulator, and then put in the housing 24, thereby constituting the fuel cell module 2 which is placed inside the exterior case. In this non-limiting embodiment, the heat insulator may be included as a constituent component of the fuel cell module 2. Moreover, a frame body that secures the heat insulator may be also included as a constituent component of the fuel cell module 2. The housing 24 includes a housing main body 24*a* and a lid body 24*b*. The lid body 24*b* is connected with the heat exchanger 31 for processing exhaust gas from the cell stack device 20.

The exhaust gas generated in the fuel cell module 2 is discharged from the cell stack device 20, and is then supplied through an exhaust gas flow channel 104 to the heat exchanger 31. The heat exchanger 31 is connected with a circulatory line 105 and carries out heat exchange between the exhaust gas and a medium introduced in the circulatory line 105. For example, water can be used as the medium. Under the heat exchange, the exhaust gas is cooled down, whereas the medium is heated by the heat of the exhaust gas. When the exhaust gas is cooled down, water vapor contained in the exhaust gas is split into water and vapor. The vapor is discharged through an exhaust vapor flow channel 107 out of a vapor outlet. The water separated from the exhaust gas in the gas-cooling process is conveyed to the condensate water tank 34 through a condensate water collection channel 106. In the condensate water tank 34, the water is purified into pure water by ion exchange, for example. The pure water is introduced into the water supply pipe 101, and then supplied to the reformer 10 as reformed water. Unnecessary water is discharged out of a drain 109.

The medium is circulated successively through the heat storage tank 32, the heat dissipator 33, and the heat exchanger 31. The medium is stored in the heat storage tank 32. The medium is conveyed from the heat storage tank 32 to the heat dissipator 33, and, after being cooled down, the cooled medium is delivered to the heat exchanger 31. In the heat exchanger 31, the medium is heated under heat exchange with the exhaust gas. The medium having an elevated temperature is refluxed into the heat storage tank 32. The heat storage tank 32 is connected with a hot-water supply pipe 108*b* for delivering heated water and a water supply pipe 108*a* for supplying cold water.

Figure 3:
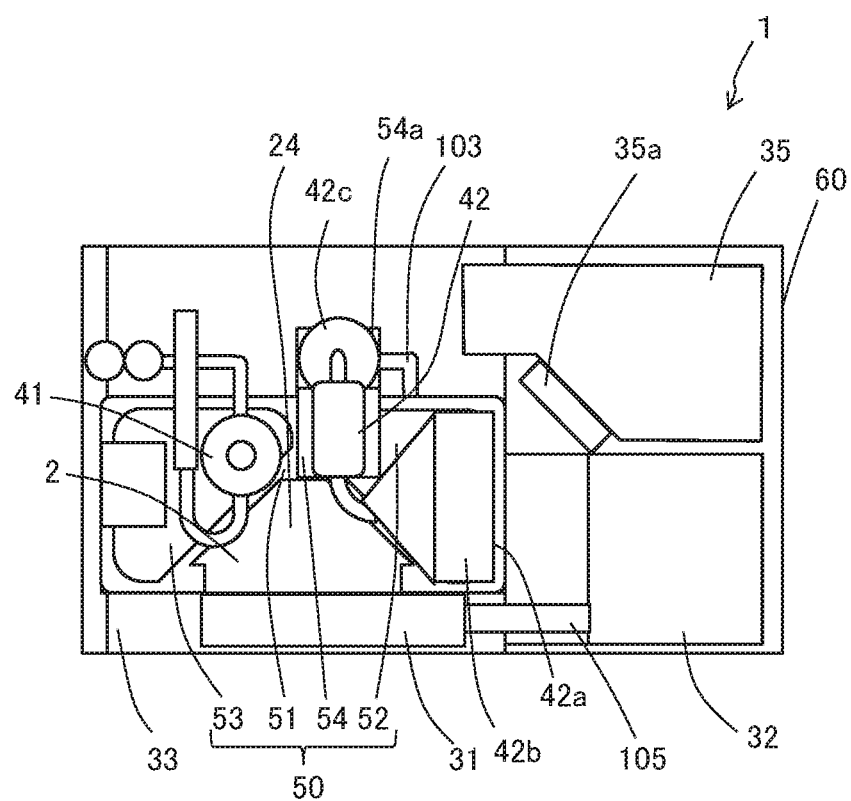
FIG. 3 is a plan view showing an example of the fuel cell device according to the non-limiting embodiment.
Figure 4:
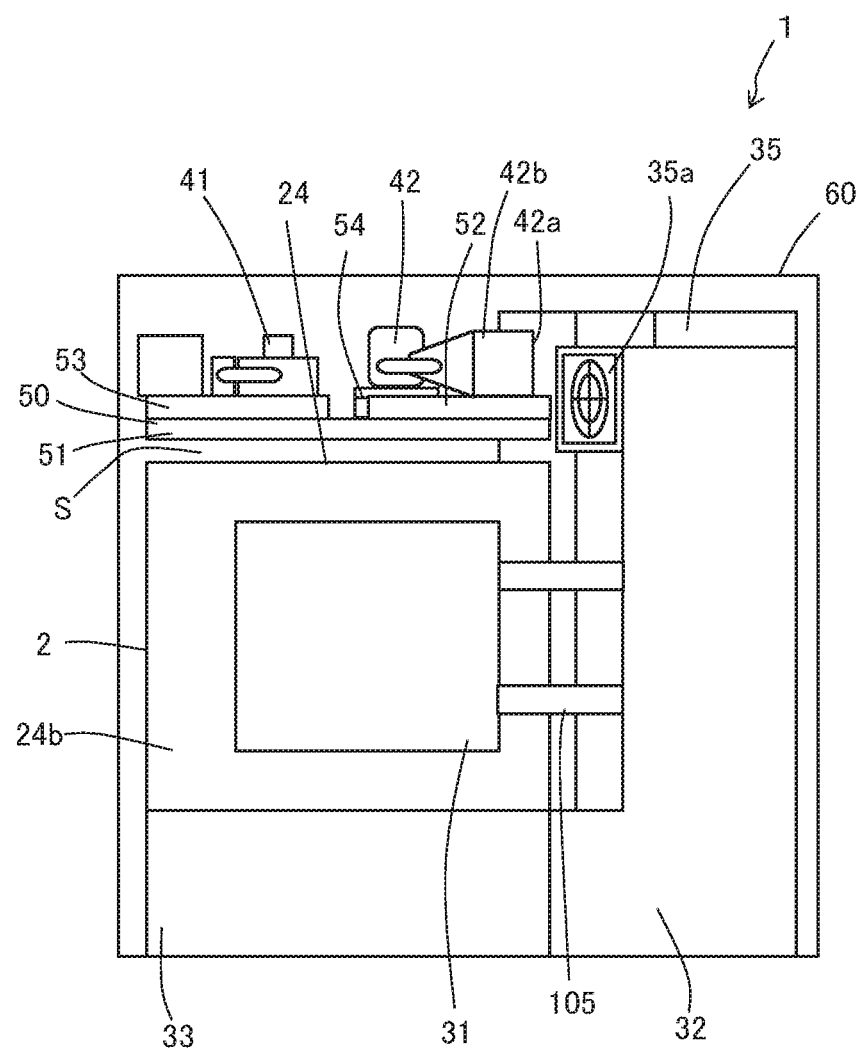
FIG. 4 is a side view showing an example of the fuel cell device according to the non-limiting embodiment.
Figure 5:
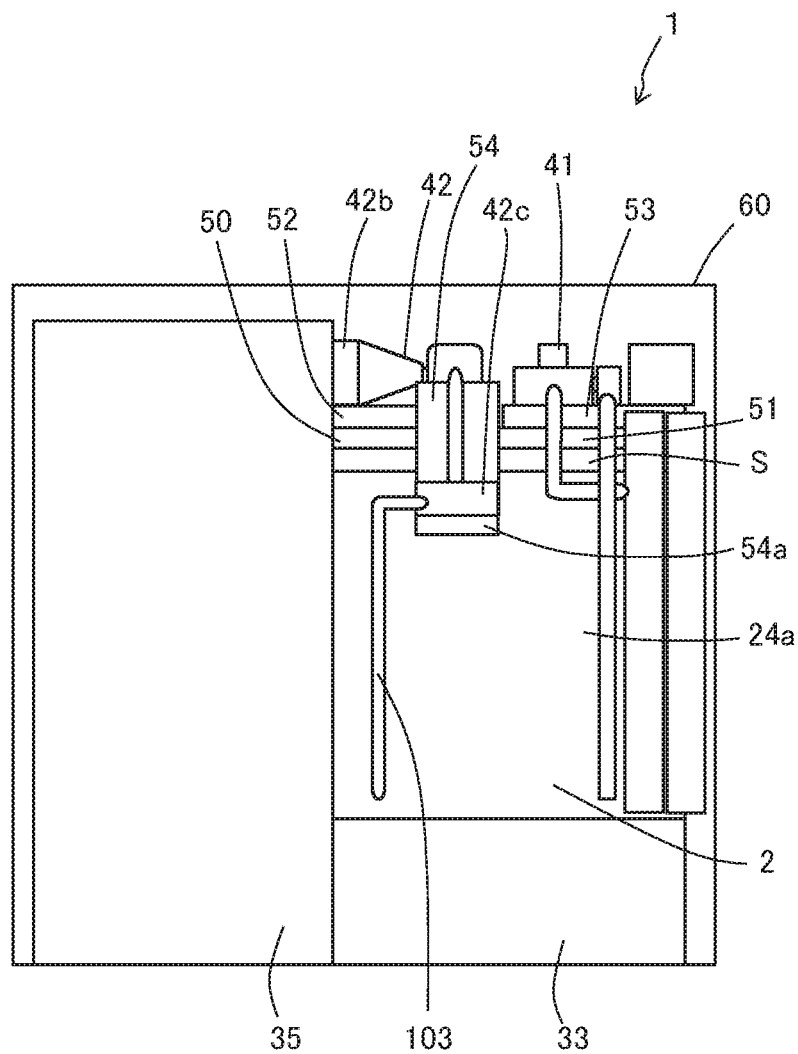
FIG. 5 is a side view showing an example of the fuel cell device according to the non-limiting embodiment.

FIG. 3 is a plan view showing an example of the fuel cell device according to the non-limiting embodiment. FIG. 4 is a side view showing an example of the fuel cell device according to the non-limiting embodiment. For the purpose of illustration of the interior of the fuel cell device, some components such as an exterior case and piping arrangement are not shown in the drawings. Moreover, FIG. 5 is a side view showing an example of the fuel cell device according to the non-limiting embodiment, wherein an opposite side of the fuel cell device to the side of the fuel cell device shown in FIG. 4 is shown. The fuel cell device 1 includes the fuel cell module 2 placed inside an exterior case 60. The heat exchanger 31, is secured to the lid body 24*b* of the fuel cell module 2, and is located on a side surface of the fuel cell module 2. Looking from above the fuel cell module 2, the supplied-power adjustment section 35 and the heat storage tank 32 that are arranged side by side is juxtaposed to the fuel cell module 2 in a longitudinal direction thereof. The supplied-power adjustment section 35 serves as a so-called power conditioner, and, a wiring board and so forth are housed in a casing thereof.

In this non-limiting embodiment, for example, the fuel supply device 41 and the air supply device 42 are located on the upper side of the fuel cell module 2 shaped in a rectangular prism (hereafter also referred to simply as the "upper side"), and thus, these devices may be defined as upper auxiliary machines. In this construction, the fuel supply device 41 and the air supply device 42 may be secured to a rack member 50. As employed herein the term "upper side" refers to a part of the fuel cell module 2 which lies above an imaginary plane that divides the housing 24 of the fuel cell module 2 into two equal portions in the vertical direction. The rack member 50 may include a rack member main body 51, an air-system rack member 52, a fuel-system rack member 53, and an extension portion 54.

Thus, at least one auxiliary machine of the plurality of auxiliary machines is made as the upper auxiliary machine located on the upper side of the fuel cell module 2. This facilitates maintenance operation for the auxiliary machine. The upper auxiliary machines are not limited to the fuel supply device 41 and the air supply device 42. Which one of the auxiliary machines is to be selected as the upper auxiliary machine, in particular, is determined in accordance with maintenance frequency and durability.

A fan 35*a* is located on the upper side of the fuel cell module 2. The fan 35*a* of the non-limiting embodiment serves as an air release fan that allows warmed air in the supplied-power adjustment section 35 to pass out the supplied-power adjustment section 35 into the exterior case 60. The fan 35*a* is positioned for the release of air in the direction in which the auxiliary machines are arranged.

In this construction, the fan 35*a* located on the upper side of the fuel cell module 2 prevents stagnation of air at the upper side of the fuel cell module 2. Since this can suppress a rise in temperature at the upper side of the fuel cell module 2, it is possible to lessen the influence of heat upon the upper auxiliary machines, and to suppress reliability deterioration in the upper auxiliary machines.

The air supply device 42 is configured so that air that has entered through an air intake opening 42*a* can be supplied to the fuel cell module 2 through an air filter 42*b*, a blower 42*c*, and the air supply pipe 103. The air intake opening 42*a* is located on the upper side of the fuel cell module 2. Since it is possible to deliver the upwardly traveling warm air to the air supply device 42, it is possible to keep the fuel cell module 2 in high-temperature conditions, and to enhance the power generation efficiency of the fuel cell device 1. The air supply pipe 103 may be partly constructed of resin tubing.

Moreover, the air release fan of the supplied-power adjustment section 35 can be utilized to impart motion to air present on the upper side, and therefore this can eliminate providing a fan for the specific purpose of imparting motion to air within the exterior case 60, and thus achieve cost reduction.

The fan 35*a* located on the upper side is not limited to the air release fan of the supplied-power adjustment section 35, but may be of any fan that can produce a flow of air around the upper auxiliary machines. For example, it is possible to use a ventilation fan, disposed in the exterior case 60 so as to be located on the upper side, for carrying out the ventilation of air present in the exterior case 60.

Moreover, the air intake opening 42*a* of the air supply device 42 faces the fan 35*a*. This "facing" condition means that a direction in which air is exhausted from the fan 35a and a direction in which air is taken in by the air intake opening 42a intersect. This design allows air released from the fan 35a to enter the air intake opening 42a of the air supply device 42. That is, following the cooling of the supplied-power adjustment section 35, warm air is taken into the fuel cell module 2, whereby it is possible to keep the fuel cell module 2 in high-temperature conditions, and to enhance the power generation efficiency of the fuel cell device 1.

The rack member 50 for mounting the upper auxiliary machines is disposed inside the exterior case 60. In this non-limiting embodiment, the rack member 50 is located on the upper side of the fuel cell module 2. More specifically, the rack member 50 may be attached to a frame body (not shown) that covers the housing 24 of the fuel cell module 2.

The rack member 50 is spaced away from the top of the fuel cell module 2. That is, a space S is formed between the rack member 50 and each of the heat insulator and the frame body disposed on an outer periphery of the housing 24 of the fuel cell module 2. Although the housing 24 of the fuel cell module 2 undergoes a rise in surface temperature due to the operation of the fuel cell module 2, the space S between the fuel cell module 2 and the rack member 50 makes it possible to reduce transmission of heat from the housing 24 to the rack member 50. Accordingly, it is possible to suppress reliability deterioration in the rack member 50, as a matter of course, and also suppress reliability deterioration in the auxiliary machines mounted on the rack member 50.

Moreover, the fan 35a and the rack member 50 are positioned so that a flow of air from the fan 35a can be split by the rack member 50 into an air stream which flows toward the upper auxiliary machines located above the rack member 50 and an air stream which flows through the space S between the fuel cell module 2 and the rack member 50. A portion for the splitting of the flow of air (flow-splitting portion) corresponds to a part of the side surface of the rack member 50 on which a flow of air impinges from the fan 35a. For example, a hole or a current plate may be provided to obtain the flow-splitting portion. Rather than providing the current plate or other, simply by configuring a part of the side surface of the rack member 50 on which a flow of air impinges from the fan 35a to permit splitting of the air flow into an air stream which flows above the rack member 50 and an air stream which flows below the rack member 50, it is possible to obtain the function of the flow-splitting portion. For example, part of the edge of the rack member 50 may be bent upwardly. In another alternative, the upper surface of the rack member 50 may be provided with a hole which serves as the flow-splitting portion so that the air flow enters the hole. Such a design allows occurrence of a flow of air also in the space S below the rack member 50, and thus can suppress stagnation of air in the space S, and reduce a rise in temperature around the rack member 50.

Figure 6A:
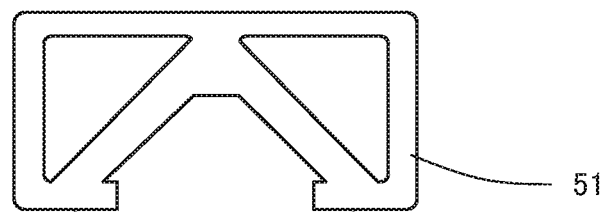
FIG. 6A is a plan view showing an example of a rack member main body of the fuel cell device according to the non-limiting embodiment.
Figure 6B:
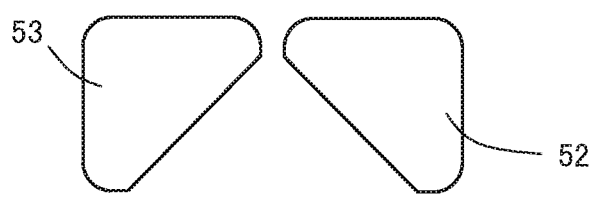
FIG. 6B is a plan view showing an example of the arrangement of an air-system rack member and a fuel-system rack member of the fuel cell device according to the non-limiting embodiment.
Figure 6C:
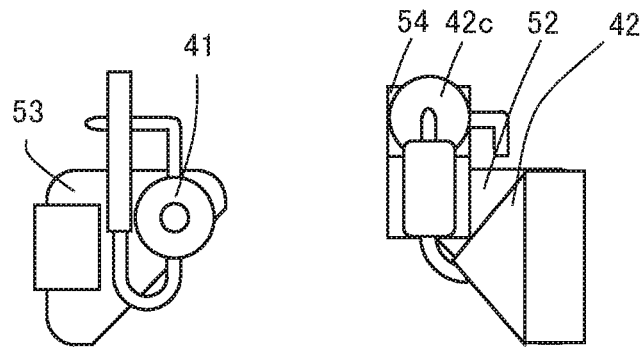
FIG. 6C is a plan view showing an example of the arrangement of the air-system rack member, the fuel-system rack member, and the auxiliary machines of the fuel cell device according to the non-limiting embodiment.
Figure 6D:
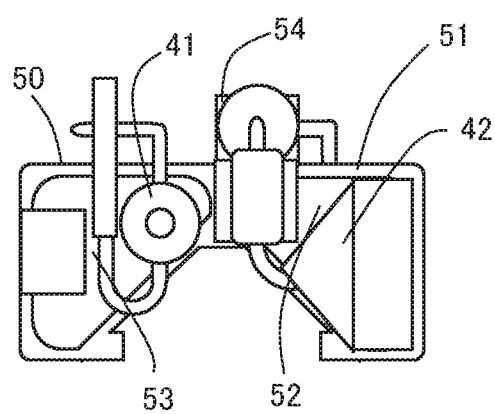
FIG. 6D is a plan view showing an example of the arrangement of a rack member and the auxiliary machines of the fuel cell device according to the non-limiting embodiment.

FIG. 6A is a plan view showing an example of the rack member main body of the fuel cell device according to the non-limiting embodiment. FIG. 6B is a plan view showing an example of the arrangement of the air-system rack member and the fuel-system rack member of the fuel cell device according to the non-limiting embodiment. FIG. 6C is a plan view showing an example of the arrangement of the air-system rack member, the fuel-system rack member, and the auxiliary machines of the fuel cell device according to the non-limiting embodiment. FIG. 6D is a plan view showing an example of the arrangement of the rack member and the auxiliary machines of the fuel cell device according to the non-limiting embodiment. The rack member 50 includes the rack member main body 51, the air-system rack member 52, the fuel-system rack member 53, and the extension portion 54. The air-system rack member 52 and the fuel-system rack member 53 are each configured to be detachable from the rack member main body 51. As shown in FIG. 6C, the air supply device 42, such as the air filter 42b and the blower 42c, which is connected to the air supply pipe 103 is mounted fixedly on the air-system rack member 52, and, the fuel supply device 41 is mounted fixedly on the fuel-system rack member 53. Moreover, the air-system rack member 52 and the fuel-system rack member 53 that bear the auxiliary machines are detachably secured to the rack member main body 51. The rack member main body 51 is detachably secured to the fuel cell device 1. This makes it possible to remove the rack member 50, keeping the auxiliary machine mounted on the rack member 50, from the fuel cell device 1 for the maintenance of the auxiliary machine, and thereby increase maintenance work efficiency.

For example, when, among the air supply device 42 and the fuel supply device 41, maintenance solely on the air supply device 42 is carried out, simply by removing the air-system rack member 52 alone from the rack member main body 51, the air supply device 42 mounted on the air-system rack member 52 can carry out maintenance. On the other hand, when maintenance solely on the fuel supply device 41 is carried out, simply by removing the fuel-system rack member 53 alone from the rack member main body 51, the fuel supply device 41 mounted on the fuel-system rack member 5 can carry out maintenance. Thus, the rack member 50 can be divided into portions, at least one of which is detachable. This permits removal of only the auxiliary machine for maintenance, and thus further increase in maintenance work efficiency can be achieved.

Figure 7:
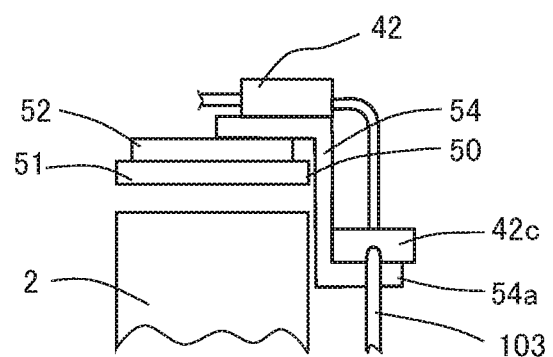
FIG. 7 is a fragmentary side view showing an example of the fuel cell device according to the non-limiting embodiment.

FIG. 7 is a fragmentary side view showing an example of the fuel cell device according to the non-limiting embodiment. As shown in FIGS. 6A, 6B, 6C, 6D, and 7, in the air supply device 42 mounted on the rack member 50, the air filter 42b having the air intake opening 42a on the rack member 50 is provided. Air having passed through the air filter 42b is supplied to the blower 42c attached to the extension portion 54 extending on a lateral side of the fuel cell module 2. One end of the extension portion 54 is secured onto the air-system rack member 52. The extension portion 54 extends downwardly along the side wall of the fuel cell module 2, and is bent in the form of the letter "L". The other end of the extension portion 54 constitutes a blower mounting portion 54a. The blower 42c is fixedly mounted on the blower mounting portion 54a. Air having passed through the blower 42c is supplied to the cell stack device 20 through the air supply pipe 103. Thus, the attachment of the auxiliary machine to the extension portion 54 permits effective use of the space beside the fuel cell module 2, and thus size reduction of the fuel cell device 1 can be achieved. The extension portion 54 may also be obtained by bending part of the rack member 50.

Moreover, the air supply pipe 103 connected at one end to the blower 42c extends downwardly along the side surface of the fuel cell module 2, and, the other end of the air supply pipe 103 is connected to the lower part of the fuel cell module 2. Thus, by locating the blower 42c on the upper side of the fuel cell module 2, even if air containing moisture or the like flows back from the fuel cell module 2, the air is cooled down and liquefies in the piping arrangement, then the liquefied water can travel downwardly by gravitation, and be eventually returned to the fuel cell module 2. In addition, it is possible to restrain the moisture from flowing into the blower 42c.

Moreover, the piping arrangement such as the circulatory line 105 through which water, etc. flows is positioned so as to avoid a region above the fuel cell module 2. In this case, even in the event of water leakage in the piping arrangement, the fuel cell module 2 and the auxiliary machines can be protected from leaked water, and enhance the reliability of the fuel cell device 1.

While the fuel supply device 41 serves to deliver a raw fuel to the reformer 10 disposed in the fuel cell module 2, the raw fuel supply pipe 100 is typically constructed of metallic tubing. The metallic tubing may undergo amplification of vibration due to metal fatigue caused by pump vibration in the fuel supply device 41 or on contact with the housing 24. In this regard, it is advisable to use rubber tubing to constitute part of the piping arrangement which is located on a downstream side of the fuel supply device 41 for the purpose of reduction in vibration.

The disclosure has been described in detail, it being understood that the application of the disclosure is not limited to the non-limiting embodiments as described heretofore, and various changes, modifications, and improvements may be made therein without departing from the scope of the disclosure.

REFERENCE SIGNS LIST

1: Fuel cell device
2: Fuel cell module
23: Fuel cell
24: Housing (Container)
35: Supplied-power adjustment section
35a: Fan
50: Rack member
60: Exterior case

What is claimed is:

1. A fuel cell device, comprising:
   a fuel cell module comprising a container and a fuel cell housed in the container;
   a plurality of auxiliary machines configured for operating the fuel cell module; and
   an exterior case that houses the fuel cell module and the auxiliary machines;
   the plurality of auxiliary machines comprising a plurality of upper auxiliary machines located on an upper side of the fuel cell module;
   the fuel cell device further comprising a fan located on the upper side of the fuel cell module; and
   a rack member which is disposed inside the exterior case and to which the plurality of upper auxiliary machines are mounted in sequence laterally along the rack member,
   the rack member spaced away from a top of the fuel cell module,
   the rack member comprising a plurality of portions arranged in sequence laterally along the rack member, and at least one of the plurality of portions is detachable from the fuel cell device, wherein
   the plurality of auxiliary machines comprise:
   a fuel supply device, and
   an air supply device; and
   the rack member comprises:
   an air-system rack member to which the air supply device is attached, and
   a fuel-system rack member to which the fuel supply device is attached.

2. The fuel cell device according to claim 1, wherein an intake opening configured for intake of oxygen-containing gas for supply to the fuel cell module is located on the upper side of the fuel cell module.

3. The fuel cell device according to claim 2, further comprising:
   a supplied-power adjustment section configured to supply electric power generated in the fuel cell module to an external load,
   wherein the fan is an air release fan for releasing heat generated from the supplied-power adjustment section.

4. The fuel cell device according to claim 3, wherein the intake opening faces the air release fan.

5. The fuel cell device according to claim 1, wherein the rack member is positioned to split a flow of air from the fan into a space between the rack member and the fuel cell module.

6. The fuel cell device according to claim 1, further comprising:
   an extension portion extending on a lateral side of the fuel cell module,
   wherein the upper auxiliary machine which is located on an upper side of the fuel cell module is attached to the extension portion.

7. The fuel cell device according to claim 1, further comprising:
   a piping arrangement through which water or a heat medium is configured to flow,
   the piping arrangement being positioned so as to avoid a region above the fuel cell module.

8. The fuel cell device according to claim 1, wherein the at least one of the plurality of portions of the rack member is detachable from the fuel cell device in a state where at least one of the plurality of upper auxiliary machines is mounted on the at least one of the plurality of portions of the rack member.

9. The fuel cell device according to claim 1, wherein the rack member further comprises a rack member main body from which at least one of the air-system rack member and the fuel-system rack member is detachable.

* * * * *